United States Patent
Owen et al.

(10) Patent No.: US 6,233,084 B1
(45) Date of Patent: May 15, 2001

(54) OPTICAL DISPLAY SYSTEM INCLUDING AN ACHROMATIZED FERROELECTRIC LIGHT VALVE

(75) Inventors: Geraint Owen; Laurence M. Hubby, Jr., both of Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/363,271

(22) Filed: Jul. 28, 1999

(51) Int. Cl.[7] ............................................. G02F 1/03
(52) U.S. Cl. .......................... 359/247; 353/37; 349/100; 349/113; 349/117; 359/246; 359/249; 359/495; 359/499; 359/629; 359/634
(58) Field of Search ........................ 252/299.01; 349/2, 349/5, 96, 100, 113, 117, 119, 121; 353/31, 37; 359/246, 247, 256, 291, 494, 495, 499, 249, 618, 629, 634

(56) References Cited

U.S. PATENT DOCUMENTS

| | | |
|---|---|---|
| 5,327,270 | 7/1994 | Miyatake ................................ 349/9 |
| 5,392,142 * | 2/1995 | Mitsutake et al. ...................... 349/77 |
| 5,568,283 * | 10/1996 | Mitsutake et al. ...................... 349/74 |
| 5,658,490 | 8/1997 | Sharp et al. ..................... 252/299.01 |
| 5,798,809 * | 8/1998 | Nakamura et al. ................... 349/119 |
| 6,005,722 * | 12/1999 | Butterworth et al. ............... 359/712 |
| 6,075,577 * | 6/2000 | Crandall ................................. 349/25 |
| 6,122,028 * | 9/2000 | Gilmour et al. ..................... 349/117 |

* cited by examiner

*Primary Examiner*—Georgia Epps
*Assistant Examiner*—David N. Spector

(57) ABSTRACT

An optical display system includes a source of white uncollimated light, a color separator for separating the white light into spectral components, a reflective ferroelectric light valve for spatially modulating the spectral components, and a polarizing beam splitter for directing vertically polarized light towards a display lens. The system further includes a corrective film disposed in an optical path between the white light source and the light valve. The film, which may be made of a ferroelectric material or other birefringent material, ensures that retardance of the light valve is approximately 180 degrees or some other desired angle over a spectrum of interest. In this manner, the light valve is achromatized by the film.

17 Claims, 3 Drawing Sheets

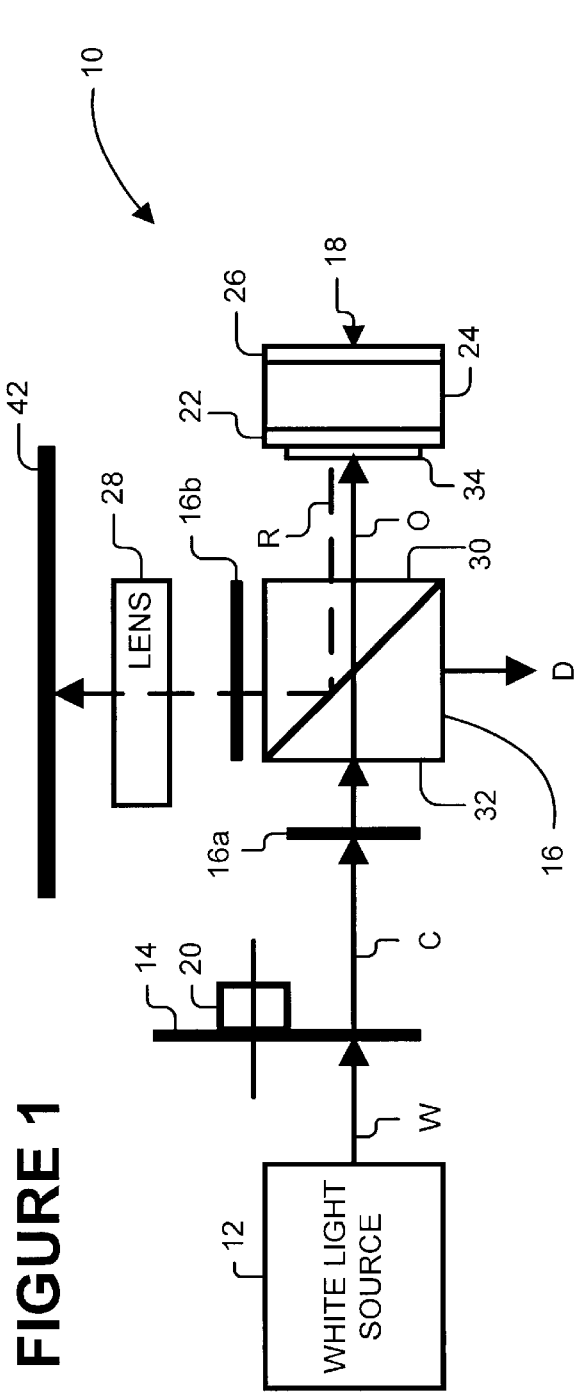
FIGURE 1
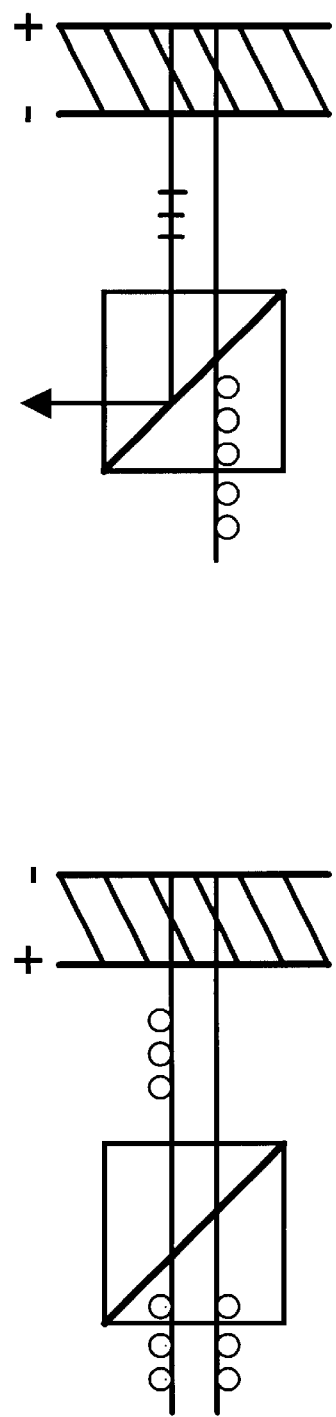
FIGURE 3a
FIGURE 3b

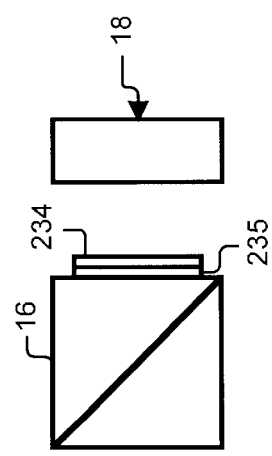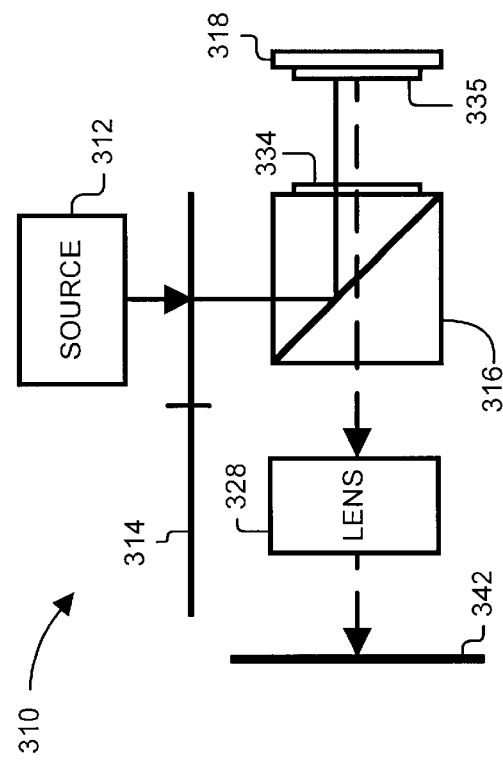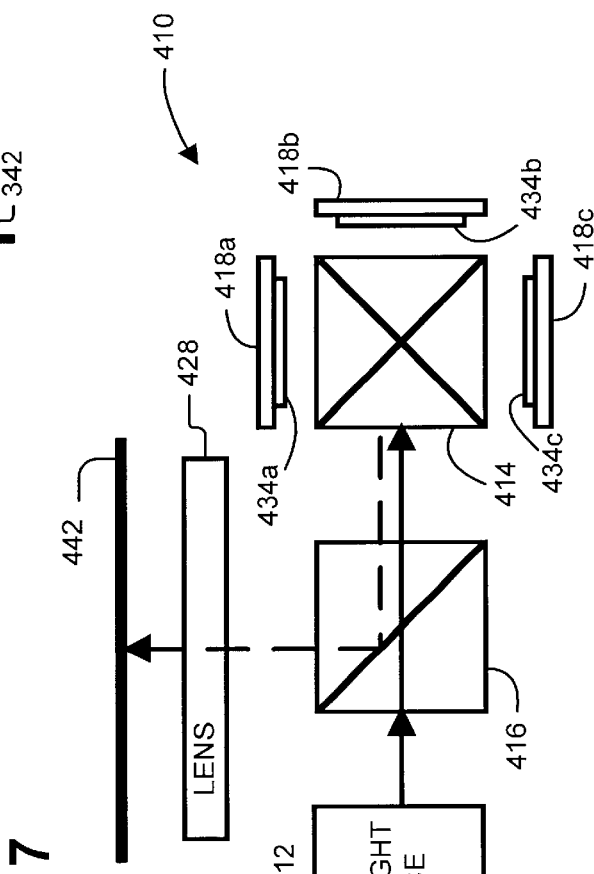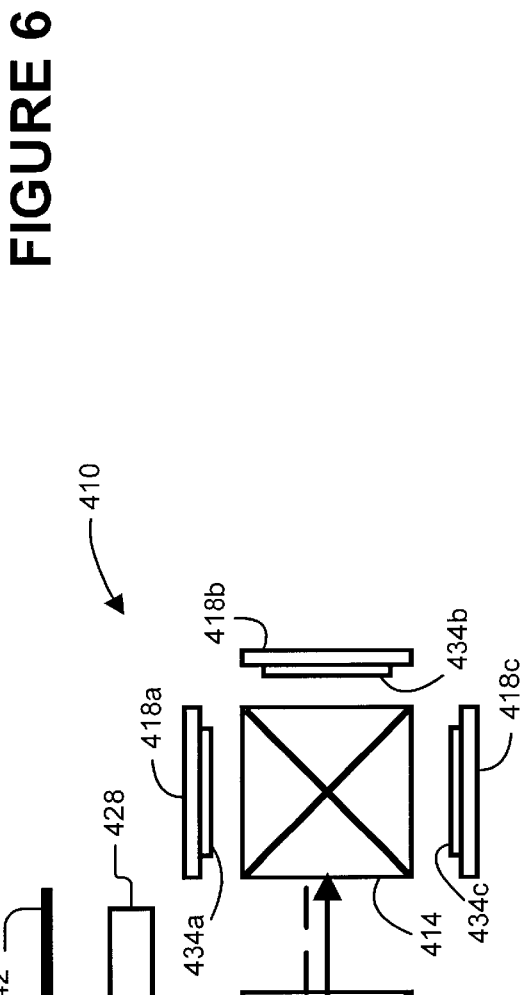

OPTICAL DISPLAY SYSTEM INCLUDING AN ACHROMATIZED FERROELECTRIC LIGHT VALVE

BACKGROUND OF THE INVENTION

The present invention relates to optical display systems. More specifically, the present invention relates to an optical display system including a ferroelectric light valve.

A typical liquid crystal display ("LCD") projection system includes a source of white light, a means for separating the white light into red, green and blue spectral components, and a light valve for spatially modulating each of the spectral components. Instead of using a single white light source, separate light sources may be used for each primary color (e.g., R,G, B or Y,M,C). Such sources could be, for example, LEDs or laser diodes. The light valve performs the spatial modulation in response to a video signal generated by a computer. Resulting are images in red, green and blue color planes. The color planes may be recombined and then projected onto a screen, or they may be flashed in sequence onto the screen at such a rate that a viewer perceives only a single image.

LCD projection technology is now being adapted for use in computer monitors, television sets and other devices that use cathode ray tubes. It is anticipated that display systems including light valves will replace systems including cathode ray tubes. If this happens, computer monitors, television sets and other devices will become more compact, lighter in weight, and less expensive.

A variety of different light valves could be used. Among the various light valves are transmissive light valves, reflective light valves, ferroelectric light valves, nematic twisted light valves, digital micro-machined mirror light valves, and diffraction grating-type light valves.

The reflective ferroelectric light valve spatially modulates the spectral components by polarizing the components in different directions. Light that is reflected by the ferroelectric light valve might be polarized vertically when the light valve is "on" and horizontally when the light valve is "off." The polarized light is reflected towards a polarizing beam splitter. Reflected light that is polarized vertically might be reflected by the polarizing beam splitter towards a viewing plane, while reflected light that has been polarized horizontally might be directed elsewhere. Thus, if all three color components of a given pixel are polarized vertically, that pixel might appear gray or white on the viewing plane. If all of the color components of a given pixel are horizontally polarized, that pixel will appear black on the viewing plane.

It is often desirable to have a high contrast in the image displayed on the viewing plane. That is, it is often desirable for the black colors to be as black as possible and the white colors to be as white as possible. A contrast ratio of 300:1 is considered very good; a contrast ratio of 20:1 is not considered good.

To make the black colors as black as possible, the beam splitter should reflect little or no light towards the viewing plane. Ideally, each spectral component would be fully polarized so as not to be reflected by the beam splitter towards the viewing plane.

In practice, however, it is difficult to polarize each component so that no light is reflected by the beam splitter towards the viewing plane. Some light is usually reflected by the beam splitter, even when it should not be. Consequently, the contrast of the image is reduced, and the quality of the viewable image is degraded.

Poor contrast has been a problem in optical display systems including reflective ferroelectric light valves. Consequently, image quality of optical display systems based on reflective ferroelectric light valves has suffered.

There is a need to improve the contrast ratio in optical display systems including reflective ferroelectric light valves.

SUMMARY OF THE INVENTION

This need is met by the present invention, which may be regarded as an optical display system. According to one aspect of the invention, the display system includes a ferroelectric light valve; a source of uncollimated spectral components; and a beam splitter disposed in an optical path between the source and the light valve. The system further includes at least one corrective film disposed in an optical path between the spectral component source and a corresponding ferroelectric light valve. Each corrective film ensures that retardance of the light valve is at a desired angle over an entire spectral range of interest.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 is an illustration of an optical display system in accordance with the present invention;

FIGS. 3a and 3b are illustrations of a beam splitter and a reflective ferroelectric light valve during ideal operation;

FIG. 5 is an illustration of a corrective film secured to a different surface; and FIGS. 6 and 7 are illustrations of alternative optical display systems in accordance with the present invention.

DETAILED DESCRIPTION OF THE INVENTION

Figure 4:
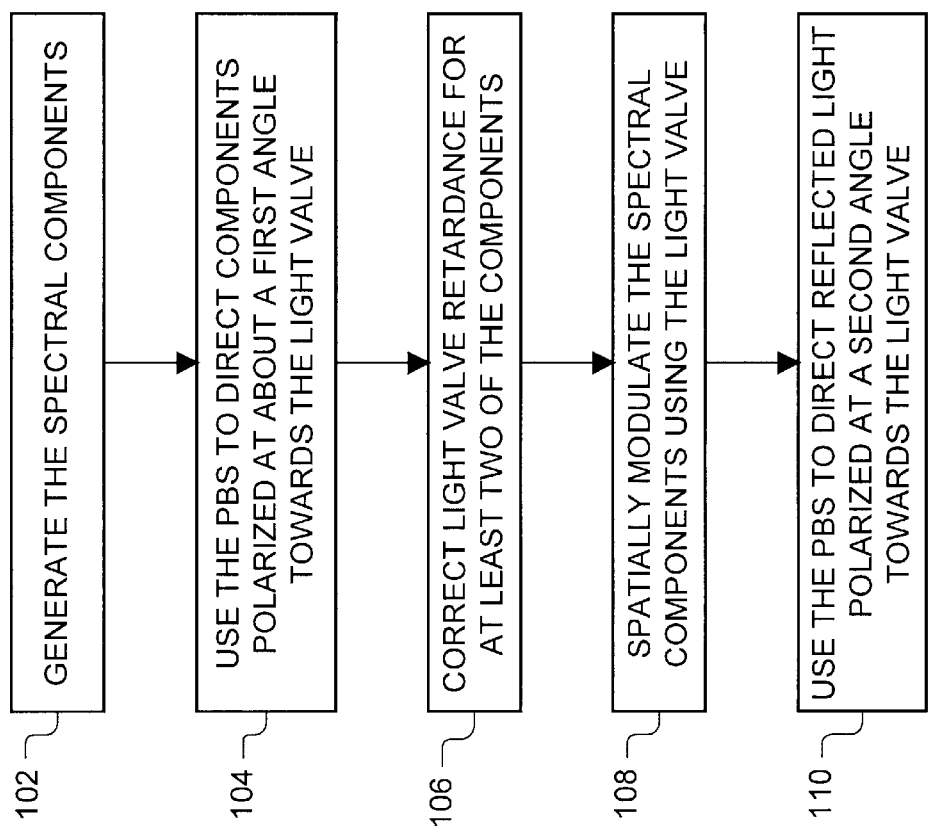
FIG. 4 is a method of displaying an image in accordance with the present invention.

As shown in the drawings for purposes of illustration, the present invention is embodied in an optical display system including a reflective ferroelectric light valve. The reflective ferroelectric light valve is achromatized to improve contrast ratio. Higher contrast ratio results in higher quality images.

FIG. 1 shows an optical display system 10 including a white light source 12, a color wheel 14, a polarizing beam splitter ("PBS") 16, and a reflective ferroelectric light valve 18. During operation of the optical display system 10, the white light source 12 generates a beam W of white light. A typical white light source 12 includes a reflector and an arc lamp such as a metal halide arc lamp. The reflector may be an elliptical reflector that collects and focuses the arc lamp light into the white beam W. In the alternative, the arc lamp light may be collected and focused into the white beam W by a combination of a parabolic reflector and a lens.

The beam W of white light is separated into red, green and blue spectral components by the color wheel 14. The color wheel 14, which is rotated by a motor 20, includes red, green and blue filters. When the red filter is moved in front of the white beam W, only the red component of the white beam W is passed by the color wheel 14. When the green filter is moved in front of the white beam W, only the green component of the white beam W is passed. When the blue filter is moved in front of the white beam W, only the blue component of the white beam W is passed. Thus, the color wheel 14 filters the white beam W to produce a color beam C that changes colors from red to blue to green to red to blue to green, and so on at a rate that is proportional to the angular rotation rate of the color wheel 14. The wavelength of the blue spectral component is within a range of about 400 to 500 nm, the wavelength of the green spectral component is within a range of about 500 to 600 nm, and the wavelength of the red spectral component is within a range of about 600 to 700 nm.

The color beam C entering the PBS 16 is unpolarized. However, the PBS 16 has the property of transmitting light polarized in a certain direction (e.g., 0° or "horizontal") and reflecting light polarized in an orthogonal direction (e.g., 90° or "vertical"). That portion D of the color beam C that is reflected by the PBS 16 may be absorbed in a "beam dump" or it may be recycled by a "polarization recovery unit."

The PBS 16 does not necessarily behave as a perfect polarizer. To compensate for this, a first "cleanup" polarizer 16a oriented at 0° may be attached to an entrance face 32 of the PBS 16 and a second cleanup polarizer 16b oriented at 90° may be attached to a chip face 30 of the PBS 16.

Figure 2:
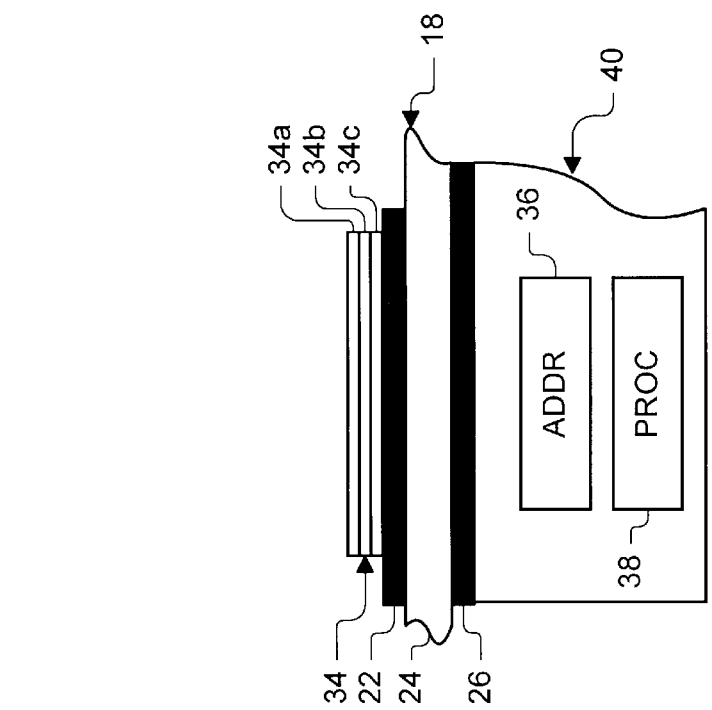
FIG. 2 is an illustration of a corrective film secured to a light-receiving surface of a reflective ferroelectric light valve.

Additional reference is made to FIG. 2. A beam O including the horizontally polarized spectral components is transmitted by the PBS 16 to a light-receiving surface of the light valve 18. The light valve 18 includes a ferroelectric liquid crystal film 24 sandwiched between first and second electrodes 22 and 26. Although the light valve 18 is shown as having only a single pair of electrodes 22 and 26, it is understood that the first and second electrodes 22 and 26 are actually divided into a large number of pixels. The electrodes 22 and 26 of each pixel are addressable.

Each pixel can be turned on and off by applying a voltage across its corresponding electrodes 22 and 26. As shown in FIGS. 2a and 2b, reversing the voltage across the electrodes 22 and 26 of a pixel causes that pixel to toggle between on and off states. Voltage is applied to each pair of pixel electrodes 22 and 26 by addressing electronics 36 underlying the pixel electrodes 22 and 26. Signal processing electronics 38 further underlie the addressing electronics 36. The light valve 18, addressing electronics 36 and signal processing electronics 38 may be integrated into a single micro-display chip 40.

The on and off states of the pixels may be commanded by a video signal V, which may be supplied by a host (e.g., a desktop computer). When the red filter of the color wheel 14 is in front of the white beam W, the video signal V commands the light valve 18 to spatially modulate the red component of an image. When the green filter of the color wheel 14 is in front of the white beam W, the video signal V commands the light valve 18 to spatially modulate the green component of the image. When the blue filter of the color wheel 14 is in front of the white beam W, the video signal V commands the light valve 18 to spatially modulate the blue component of the image. Resulting are red, green and blue color planes of the image.

The light polarized by the PBS 16 passes through the first electrode 22, which may be made of a material such as indium tin oxide ("ITO"). When the light valve 18 is "on" during a first pass through the ferroelectric liquid crystal 24, the spectral component becomes circularly polarized.

After the first pass, the circularly polarized light is reflected by the second electrode 26, which may be made of a material such as aluminum. On a second pass through the ferroelectric liquid crystal film 24, the light becomes linearly polarized once again. The direction of polarization after the second pass is approximately perpendicular to the direction before the first pass. When the light valve 18 is "off," the state and direction of polarization of the light is unchanged as it passes through the light valve 18 and exits it.

Assume that polarization angle of incident light is 0°. When a pixel is off, the orientation of an optical axis of the film 24 between the pixel electrodes 22 and 26 is also at 0°. The polarization angle of the reflected light leaving the pixel remains polarized at 0°. When the pixel is on, however, the orientation of the optical axis is at an angle $\phi$ of about 45°. The polarization angle of the reflected light reflected light leaving the light valve 18 is now equal to $2\phi=90°$.

Therefore, during ideal operation, the reflected light becomes linearly polarized at an angle of zero degrees if the pixel is off. Such horizontally polarized light passes back through the first electrode 22, but it is not reflected towards the display lens 28 (see FIG. 3a); instead it is transmitted back through the PBS 16 towards the light source 12.

During ideal operation, the reflected light becomes linearly polarized at an angle of ninety degrees if the pixel is on. Such vertically polarized light passes back through the first electrode 22 and is reflected by the PBS 16 towards a display lens 28 (see FIG. 3b).

The display lens 28 receives the color planes that are reflected by the beam splitter 16. The display lens 28 is designed to form the image on a proximately-located glass or plastic rear projection screen 42 of a computer monitor or television. The color planes may be combined into a single image prior to being projected onto the screen 42, or the color planes may be flashed in sequence onto the screen 42 at such a rate that a viewer perceives only a single image.

Under the ideal operation described above, a black color is displayed by linearly polarizing all three components at zero degrees. In practice, however, this is very difficult to achieve.

One reason is that all of the light incident on the light valve 18 is not polarized at 0°. Due to a phenomenon known as a "compound angle effect," which occurs in polarizing beam splitters, the incident light consists of a continuum of components having polarization angles covering a range of $\pm\theta$, where $\theta$ may be several degrees. The angle of polarization of a ray of light emerging from a chip face 30 of the PBS 16 is a function of the angle the incoming ray makes to a normal to an entrance face 32 of the PBS 16. Thus, when a light cone impinges the entrance face 32, the emerging light does not have a unique polarization direction. Instead, the emerging light is polarized over a range of angles. The compound angle effect is quite large for a typical PBS 16 accepting a 0.3 NA (that is, numerical aperture) cone of light. The range of polarization angles will be about ±13°. In general, if the numerical aperture is equal to sine, and N is the refractive index of the glass of which the PBS 16 is made, then the polarization angle $\theta \simeq \alpha/N$ (where $\alpha$ is expressed in radians).

Another reason why ideal operation is difficult to achieve is that retardance of the light valve 18 is not exactly 180° over the entire spectral range handled by that light valve 18. Even if the retardance angle was 180° at the center of the spectral range of interest, the retardance would typically deviate from the desired value by as much as ±30° at the extremes of the spectral range. This deviation causes the black to assume a dark color and hence degrades contrast. This degradation in contrast increases with the NA of the system due to the compound angle effect.

The effect of the retardance angle δ on contrast (C) can be calculated for a ray polarized at an angle θ to the horizontal using the formula:

$$C = 1 + \frac{\tan^2(\delta/2)}{\sin^2(2\theta)}$$

For θ=0° it follows from this formula that C→∞ for any angle δ of retardance. Thus, for a system working at small numerical apertures, the compound angle effect might be insignificant.

However, for a 0.3 NA system, an incoming ray having a polarization angle θ=13°, and a light valve 18 having a retardance δ=180° at the center of the spectral band, but only δ=120° at one extreme end, the contrast at the center of the spectral band will be very large (C→∞), but the contrast at the one extreme end only will be C=1+tan²(60°)/sin²(26°) or C=17. That is a significant degradation in contrast. Therefore, the contrast ratio is sensitive to wavelength and, in uncompensated systems, different spectral components have different contrast ratios.

However, the system 10 further includes at least one corrective film 34 disposed in an optical path between the light valve 18 and the color wheel 14. Each film 34 causes the "round trip" retardance of its corresponding component to be 180 degrees. Because the film 34 compensates for the variation of retardance with wavelength, it ensures that the retardance of the light valve 18 is approximately 180 degrees throughout the entire spectrum of interest (e.g., 400 nm to 700 nm). In this manner, the light valve 18 is achromatized and contrast degradation is reduced.

The film 34 includes at least one layer 34a, 34b, 34c. Each layer 34a, 34b and 34c may be made of a ferroelectric material or other birefringent material. Each layer 34a, 34b, 34c has chromatic properties that are chosen so as to compensate for the chromatic retardance variation of the light valve 18. Orientation should be within approximately one degree.

The film 34 may also be provided with an adhesive backing for securement to a surface. FIGS. 1 and 3 happen to show the film 34 being secured to the light-receiving surface of the light valve 18.

FIG. 4 shows a general method of using a PBS and a reflective ferroelectric light valve to display an image. The method includes the steps of generating red, green and blue spectral components (block 102); using the PBS to direct the spectral components polarized at about a first angle towards the light valve (block 104); correcting retardance of the light valve for at least two of the spectral components, the retardance being corrected before the spectral components reach a light receiving surface of the light valve (block 106); using the light valve 18 to spatially modulate the spectral components, whereby polarized light is reflected by the light valve (block 108); and using the beam splitter to direct the light polarized a second angle towards the viewing plane (block 110). Changing the spectral retardance ensures that the retardance of the light valve is approximately 180 degrees or some other desired angle over the entire spectrum of interest.

Thus disclosed is an optical display system including a ferroelectric light valve and at least one corrective film that ensures that the retardance of the light valve is approximately 180 degrees or some other desired angle over the entire spectrum of interest. By achromatizing the light valve in such a manner, contrast ratio and image quality are improved.

Applications for optical display systems according to the present invention include projection systems, television sets and computer monitors. A television set or computer monitor including an optical display system according to the present invention would be much lighter than a television set or computer monitor including a cathode ray tube. The television set or computer monitor including the optical display system according to the present invention would also have a smaller footprint. The size differential would become significant for larger viewing areas.

The invention is not limited to the specific embodiments described and illustrated above. The corrective film could be made of a birefringent material other than a ferroelectric liquid crystal film. The light valve may be designed to correct the retardance of one of the spectral components, and the corrective film may be provided to correct the other spectral components.

Two or more corrective films 234 and 235, both of which are of identical or different composition, could be stacked (see FIG. 5). The orientation angles of the corrective films 234 and 235 may be chosen so as to correct the chromatic defects of the light valve 18 almost completely. This approach has the advantage of offering a smaller deviation from δ=180° over the spectral load in question.

The film may be secured to a surface other than the light-receiving surface of the light valve. For example, a film 334 may be secured to a chip face of a PBS 316 (see FIG. 6).

Multiple films may be used in combination. For example, the first corrective film 334 may be applied to the chip face of the PBS 316 and a second corrective film 335 may be applied to the light-receiving surface of a reflective ferroelectric light valve 318 (see FIG. 6).

The display system is not limited to the arrangement shown in FIG. 1. For example, the optical display system 310 of FIG. 6 includes a white light source 312, a color wheel 314 and a PBS 316. The PBS 316 reflects horizontally polarized light from the source towards the light valve 318. The PBS 316 transmits vertically polarized light that is reflected by the light valve 318. Such light is transmitted to a display lens 328, which focuses the transmitted light onto a viewing plane 342. The PBS 316 dumps horizontally polarized light that is reflected by the light valve 318.

The invention is not limited to an optical display system including a lamp and color wheel. FIG. 7 shows an optical display system 410 including a white light source 412, a PBS 416 and a color separator 414 (e.g., dichroic mirrors, a Philips prism, an X-prism) for separating the white light into spectral components. White light from the source 412 goes first through the PBS 416 and then through the color separator 414.

A first reflective ferroelectric light valve 418a sensitive to the red spectral component is located opposite a first chip face of the color separator 414, and a first corrective film 434a is located between the first light valve 418a and the first chip face. The first corrective film 434a changes the retardance of the red spectral component only.

A second reflective ferroelectric light valve 418b sensitive to the green spectral component is located opposite a second chip face of the color separator 414, and a second corrective film 434b is located between the second light valve 418a and the second chip face. The second corrective film 434b changes the retardance of the green spectral component only.

A third reflective ferroelectric light valve 418c sensitive to the blue spectral component is located opposite a third chip face of the color separator 414, and a third corrective film 434b is located between the third light valve 418c and the third chip face. The third corrective film 434c changes the retardance of the blue spectral component only.

The polarized components are reflected by the color separator 414 towards the PBS 416. Vertically polarized components are reflected towards a display lens 428 and displayed on a screen 442.

Thus, each film 434a, 434b and 434c corrects the retardance within a narrower range of wavelengths. The first film 434a might correct retardance of light having a wavelength between for 400 nm and 500 nm, the second film 434b might correct retardance of light having a wavelength between for 500 nm and 600 nm, and the third film 434c might correct retardance of light having a wavelength between for 600 nm and 700 nm.

The corrective films 434a, 434b and 434c are shown as being attached to the light receiving surfaces of the light valves 418a, 418b and 418c. In the alternative, the films 434a, 434b and 434c could be attached to chip faces of the color separator 414.

As another alternative, a single corrective film could be used instead of three separate films 434a, 434b and 434c. The single corrective film could change the retardance of light over the entire spectrum of interest (e.g., 400 nm to 700 nm). The single corrective film could be attached to the chip face of the PBS 416 or the entrance face of the color separator 414.

Accordingly, the invention is not limited to the specific embodiments described and illustrated above. Instead, the invention is construed according to the claims that follow.

What is claimed is:

1. An optical display system comprising:
    a ferroelectric light valve;
    a source of uncollimated spectral components;
    a polarizing beam splitter disposed in an optical path between the source and the light valve; and
    at least one corrective film disposed in an optical path between the spectral component source and the ferroelectric light valve, each corrective film ensuring that retardance of the light valve is at a desired angle over a spectral range of interest.

2. The system of claim 1, wherein a single film corrects the light valve for at least two spectral components.

3. The system of claim 1, a single film corrects the light valve each spectral component.

4. The system of claim 1, wherein multiple films correct the light valve over an entire spectral range of interest.

5. The system of claim 4, wherein the multiple films are stacked.

6. The system of claim 4, wherein at least one of the multiple films is secured to a light receiving surface of the light valve and wherein at least another of the multiple films is secured to a chip face of the polarizing beam splitter.

7. The system of claim 1, wherein at least one corrective film is secured to a light-receiving surface of the light valve.

8. The system of claim 1, wherein at least one corrective film is secured to a chip face of the beam splitter.

9. The system of claim 1, wherein at least one corrective film is secured to one of the beam splitter and the light valve by an adhesive.

10. The system of claim 1, wherein the optical axes of each film is perpendicular to an optical axis of the light valve to within about one degree.

11. The system of claim 1, wherein the spectral component source includes a lamp and a color wheel intermediate the beam splitter and the lamp.

12. The system of claim 1, wherein the spectral component source includes a lamp and a color separator; wherein the beam splitter is disposed in an optical path between the lamp and an entrance face of the color separator; wherein the system further includes second and third light valves, the light valves being sensitive to different spectral components; wherein a first corrective film is disposed in an optical path between the first light valve and a first chip face of the color separator; and wherein a second corrective film is disposed in an optical path between the second light valve and a second chip face of the color separator; whereby the first and second corrective films correct retardance of the ferroelectric light valve for the first and second spectral components.

13. The system of claim 12, wherein a third corrective film is located in an optical path between the third light valve and a third chip face of the color separator; whereby the third corrective film corrects the retardance of the ferroelectric light valve for the third spectral component.

14. An optical display system comprising:
    a ferroelectric light valve;
    a source of uncollimated spectral components, the source including a lamp and a color wheel;
    a polarizing beam splitter disposed in an optical path between the color wheel and the light valve; and
    at least one corrective film disposed in an optical path between the polarizing beam splitter and the ferroelectric light valve, each corrective film ensuring that retardance of the light valve is at a desired angle over a spectral range of interest.

15. An optical display system comprising:
    a ferroelectric light valve;
    a polarizing beam splitter;
    a source of uncollimated spectral components, the source including a lamp and a color separator, the beam splitter being disposed in an optical path between the lamp and an entrance face of the color separator;
    first, second and third light valves sensitive to different spectral components;
    a first corrective film disposed in an optical path between the first light valve and a first chip face of the color separator; and
    a second corrective film disposed in an optical path between the second light valve and a second chip face of the color separator;
    whereby the first and second corrective films correct retardance of the ferroelectric light valve for the first and second spectral components.

16. The system of claim 15, further comprising a third corrective film located in an optical path between the third light valve and a third chip face of the color separator; whereby the third corrective film corrects the retardance of the ferroelectric light valve for the third spectral component.

17. A method of using a polarizing beam splitter and a ferroelectric light valve to display an image at a viewing plane, the method comprising the steps of:
    providing a plurality of spectral components to the beam splitter;
    using the beam splitter to direct spectral components polarized at about a first angle towards the light valve;
    correcting retardance of the light valve for at least two of the spectral components, the retardance being corrected before the components reach a light receiving surface of the light valve;
    using the light valve to spatially modulate the spectral components, whereby polarized light is reflected by the light valve; and
    using the beam splitter to direct the light reflected and polarized at a second angle towards the viewing plane.

* * * * *